US012142785B2

(12) United States Patent
Wakabayashi et al.

(10) Patent No.: US 12,142,785 B2
(45) Date of Patent: Nov. 12, 2024

(54) BATTERY PACK

(71) Applicant: SANYO Electric Co., Ltd., Daito (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 469 days.

(21) Appl. No.: 17/630,761

(22) PCT Filed: Jul. 27, 2020

(86) PCT No.: PCT/JP2020/028646
§ 371 (c)(1),
(2) Date: Jan. 27, 2022

(87) PCT Pub. No.: WO2021/020329
PCT Pub. Date: Feb. 4, 2021

(65) Prior Publication Data
US 2022/0271391 A1    Aug. 25, 2022

(30) Foreign Application Priority Data

Aug. 1, 2019   (JP) .................................. 2019-142581

(51) Int. Cl.
*H01M 10/05* (2010.01)
*H01M 10/0525* (2010.01)
(Continued)

(52) U.S. Cl.
CPC ..... *H01M 50/367* (2021.01); *H01M 10/0525* (2013.01); *H01M 50/213* (2021.01); *H01M 50/24* (2021.01)

(58) Field of Classification Search
CPC .. H01M 50/367; H01M 50/35; H01M 50/375; H01M 50/24; H01M 50/213;
(Continued)

(56) References Cited

U.S. PATENT DOCUMENTS 5,492,779 A * 2/1996 Ronning ............. H01M 10/613
D13/103
6,947,664 B1 * 9/2005 Yeh ........................ A47J 47/14
219/401
(Continued)

FOREIGN PATENT DOCUMENTS

JP    2001-23587 A    1/2001
JP    2001-266818 A   9/2001
(Continued)

OTHER PUBLICATIONS

International Search Report dated Oct. 20, 2020, issued in counterpart International Application No. PCT/JP2020/028646. (2 pages).

*Primary Examiner* — Raymond Alejandro
(74) *Attorney, Agent, or Firm* — WHDA, LLP (57) ABSTRACT

In a battery pack, a heat-resistant cap is coupled to an end of a battery block including battery cells each having a discharge valve on an end surface thereof and arranged in plural rows. A valve-side end surface of battery cell is arranged at a first end of the battery block to which heat-resistant cap is coupled. Heat-resistant cap includes closing plate providing a first discharge gap between the closing plate and end surface of the battery block, a peripheral wall coupled to a periphery of closing plate and providing a second discharge gap between the peripheral wall and an outer circumference of the battery block, a partition wall disposed between end surfaces of adjacent battery cells and partitioning the first discharge gap into portions at end surfaces of battery cells.

10 Claims, 7 Drawing Sheets

(51) Int. Cl.
*H01M 50/213* (2021.01)
*H01M 50/24* (2021.01)
*H01M 50/367* (2021.01)

(58) Field of Classification Search
CPC .......... H01M 50/207; H01M 10/0525; H01M 10/052; H01M 10/62; H01M 10/615
See application file for complete search history.

(56) References Cited

U.S. PATENT DOCUMENTS

| | | | |
|---|---|---|---|
| 7,871,719 B2 | 1/2011 | Houchin-Miller et al. | |
| 2009/0226803 A1 | 9/2009 | Nishino et al. | |
| 2012/0251855 A1 | 10/2012 | Miyawaki et al. | |
| 2021/0328303 A1* | 10/2021 | Hou | H01M 10/613 |

FOREIGN PATENT DOCUMENTS

| | | |
|---|---|---|
| JP | 2006-190607 A | 7/2006 |
| JP | 2007-12485 A | 1/2007 |
| JP | 2009-211909 A | 9/2009 |
| JP | 2012-204296 A | 10/2012 |

* cited by examiner

BATTERY PACK

TECHNICAL FIELD

The present invention relates to a battery pack including a chargeable battery accommodated in a battery case.

BACKGROUND ART

In recent years, a battery pack used as a power source of an electric device has been further required to have high output. A non-aqueous electrolyte secondary battery, such as a lithium ion battery, having excellent efficiency per unit volume has been employed. Although the lithium ion battery has a high output, an internal pressure may increase for some reason. In order to ensure safety against an increase in internal pressure of the battery, a discharge valve configured to open at a predetermined pressure to prevent rupture is provided (see PTL 1).

CITATION LIST

Patent Literature

PTL 1: Japanese Patent Laid-Open Publication No. 2009-211909

SUMMARY

Technical Problem

The discharge valve opens while the internal pressure becomes higher than the predetermined pressure. Since the battery is in an abnormal heat generation state in this state, high-temperature gas maybe vigorously ejected from the opening discharge valve. A battery pack including the battery cell hardly discharge the high-temperature exhaust gas vigorously ejected from the battery cell to the outside safely. The exhaust gas ejected from the discharge valve of the lithium ion battery that is a non-aqueous electrolyte secondary battery is ejected vigorously at an abnormally high temperature higher than 400° C., and may provide various adverse effects when the exhaust gas is discharged to the outside at such a high temperature. Extremely-high temperature exhaust gas ejected from the discharge valve of the battery cell may induce thermal runaway by heating other battery cells in the battery case. The thermal runaway in the battery case dramatically increases thermal energy and reduces safety.

The present invention has been developed for a purpose of preventing the above adverse effects, and an object of the present invention is to provide a battery pack preventing a decrease in safety due to high-temperature exhaust gas ejected from an opened discharge valve.

Solution to Problem

A battery pack according to an aspect of the present invention includes a battery block including battery cells arranged in plural rows, a heat-resistant cap coupled to an end of the battery block, and a battery case accommodating the battery block therein and having an exhaust opening. Each of the battery cells has a discharge valve provided on an end surface thereof. The discharge valve is configured to open when an internal pressure exceeds a predetermined pressure. The exhaust opening is configured to discharge the exhaust gas from the discharge valve to an outside of the case. A valve-side end surface of the battery cell on which the discharge valve is provided is located at a first end of the battery block to which the heat-resistant cap is coupled. The heat-resistant cap includes a closing plate providing a first discharge gap between the closing plate and an end surface of the battery block, a peripheral wall coupled to a periphery of the closing plate and providing a second discharge gap between the peripheral wall and an outer circumference of the battery block, and a partition wall provided on an end surface of the closing plate facing the battery block and between end surfaces of adjacent battery cells. The partition wall partitions the first discharge gap into portions at the end surfaces of the adjacent battery cells. The exhaust gas discharged to the valve-side end surface of the battery cell passes through a discharge gap including the first discharge gap and the second discharge gap, and is discharged from the exhaust opening to an outside.

Advantageous Effect of Invention

The battery pack of the present invention enhances safety by suppressing adverse effects caused by high-temperature exhaust gas ejected from the discharge valve of the battery cell.

DETAIL DESCRIPTION OF PREFERRED EMBODIMENT

A battery pack according to a first exemplary embodiment of the present invention includes a battery block including battery cells arranged in plural rows, a heat-resistant cap coupled to an end of the battery block, and a battery case accommodating the battery block and having an exhaust opening. Each battery cell includes a discharge valve provided on an end surface thereof. The discharge valve is configured to open when an internal pressure of the cell exceeds a predetermined pressure. The exhaust opening is configured to discharge exhaust gas from the discharge valve to an outside of the case. A valve-side end surface of each battery cell provided with the discharge valve is arranged at a first end of the battery block to which the heat-resistant cap is coupled. The heat-resistant cap includes a closing plate providing a first discharge gap between the closing plate and an end surface of the battery block, a peripheral wall coupled to a periphery of the closing plate and providing a second discharge gap between the peripheral wall and an outer circumference of the battery block, and a partition wall provided on an end surface of the closing plate facing the battery block and between end surfaces of adjacent battery cells. The partition wall partitions the first discharge gap into portions at the end surfaces of the adjacent battery cells. The exhaust gas discharged to the valve-side end surface of the battery cell is configured to pass through a discharge gap including the first discharge gap and the second discharge gap and to be exhausted from the exhaust opening to an outside.

The battery pack described above eliminates adverse effects caused by high-temperature exhaust gas ejected from the opening discharge valve and ensures high safety. This is because the battery pack described above causes the high-temperature exhaust gas ejected from the discharge valve to collide with the heat-resistant cap to reduce energy and to control the flow direction of the discharged gas. This feature is provided because of the following configure of the battery pack described above. The first end of the battery block including the battery cells arranged in plural rows is used as the valve-side end surface of each battery cell including the discharge valve. The heat-resistant cap is coupled to the end, the closing plate provided with the first discharge gap between the closing plate and an end surface of the battery block is arranged on this heat-resistant cap. The peripheral wall is provided on a periphery of the closing plate. The second discharge gap is provided between the peripheral wall and the outer circumference of the battery block. The partition wall is further provided between end surfaces of adjacent battery cells on the end surface of the closing plate facing the battery block. The partition wall partitions the second first discharge gap into portions at the end surfaces of the battery cells. The exhaust gas discharged to the valve-side end surface of the battery cell is discharged through the first discharge gap and the second discharge gap. In the battery pack described above, in the case where a particular battery cell arranged at an end of the battery block undergoes thermal runaway and ejects high-temperature exhaust gas, the exhaust gas discharged from the end surface is ejected to the first discharge gap partitioned by the partition wall and guided to the second discharge gap. The heat-resistant cap guides the high-temperature exhaust gas from the first discharge gap to the second discharge gap to attenuate and exhaust the energy, but does not cause the exhaust gas to flow to the end surface of the adjacent battery cell that has not undergone thermal runaway. In particular, the exhaust gas having a high temperature exceeding 400° C. immediately after being ejected is discharged to the outside without flowing to the end surface of the adjacent battery cell that has not undergone thermal runaway. Thus, both the energy of motion and the thermal energy of the exhaust gas are reduced and discharged to the outside while the induction of thermal runaway of the battery cell is prevented.

In the battery pack described above, the heat-resistant cap coupled to the battery block prevents the induction of thermal runaway, and reduces the energy of the exhaust gas and discharges it to the outside, so that the feature that the assembly is simple and the mass production can be performed efficiently is also achieved.

In a battery pack according to a second exemplary embodiment of the present invention, the battery block includes a battery holder positioning the battery cells at predetermined positions. The second discharge gap is provided between the peripheral wall and the battery holder.

In a battery pack according to a third exemplary embodiment of the present invention, the battery holder and the battery case are made of plastic. The heat-resistant cap is made of plastic having a higher heat resistance temperature than the battery holder and the battery case. The closing plate, the peripheral wall, and the partition wall are unitarily molded from plastic.

In a battery pack according to a fourth exemplary embodiment of the present invention, the heat-resistant cap is made of fiber-reinforced plastic reinforced with heat-resistant fibers.

In a battery pack according to a fifth exemplary embodiment of the present invention, the heat-resistant fibers are inorganic fibers.

In a battery pack according to a sixth exemplary embodiment of the present invention, the battery block further includes a lead plate provided at an end surface of the first end thereof. The lead plate connects adjacent battery cells to each other. A leading edge of the partition wall contacts a surface of the lead plate.

In a battery pack according to a seventh exemplary embodiment of the present invention, the battery cells are cylindrical batteries. In a battery pack according to an eighth exemplary embodiment of the present invention, the partition wall is arranged in a valley formed on outer peripheries of adjacent cylindrical batteries.

In a battery pack according to a ninth exemplary embodiment of the present invention, the battery cells are non-aqueous electrolyte secondary batteries. In a battery pack according to a tenth exemplary embodiment of the present invention, the battery cells are lithium ion batteries.

Hereinafter, exemplary embodiments of the present invention will be described in detail with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference numerals in a plurality of drawings indicate the identical or equivalent parts or members.

Further, the following exemplary embodiment illustrates specific examples of the technical concept of the present invention, and the present invention is not limited by the following exemplary embodiment. In addition, unless otherwise specified, dimensions, materials, shapes, relative arrangements, and the like of the constituent elements described below are not intended to limit the scope of the present invention, but are intended to be illustrative. Further, the contents described in one exemplary embodiment and one working example are also applicable to other exemplary embodiments and working examples. The sizes, positional relationships, and the like of members illustrated in the drawings may be exaggerated in order to clarify description.

Exemplary Embodiment 1

In battery pack 100 illustrated in FIGS. 1 to 6, battery block 10 including battery cells 1 arranged in plural rows is accommodated in battery case 2. Battery case 2 includes lower case 2A that is a first case and upper case 2B that is a second case coupled to the first case and closing an opening of the first case. In battery block 10 shone in FIGS. 2 to 5, battery cells 1 are arranged in two rows and four stages on the same plane. In battery block 10, two rows of battery cells 1 are arranged at predetermined positions by battery holder 4 to form battery assembly 11. Plural battery assemblies 11 are arranged and coupled in multiple stages in a longitudinal direction. Heat-resistant cap 8 is coupled to an end of battery block 10. Heat-resistant cap 8 reduces energy by controlling a flow direction of high-temperature exhaust gas ejected from the discharge valve of battery cell 1, and further, guides the exhaust gas to an exhaust opening to safely discharge the exhaust gas to an outside of battery case 2.

Battery Cell 1

Battery cell 1 is a cylindrical battery in which a discharge valve is provided on a valve-side end surface 1$a$ of the cell. The discharge valve is configured to open when an internal pressure of the cell exceeds a predetermined pressure. In the cylindrical battery, an electrode and an electrolytic solution are accommodated in a cylindrical metal case. The metal case has a sealed structure in which a sealing plate is hermetically fixed to an opening of a cylindrical package can with a closed bottom. The package can is fabricated by pressing a metal plate into a cylindrical shape. The sealing plate is caulked and hermetically fixed to a peripheral edge of the opening of the package can with a packing made of insulating material interposed between the sealing plate and the package.

Although not illustrated, in order to prevent battery cell 1 from damage due to an abnormally high internal pressure of the metal case, the discharge valve is provided on the sealing plate, and the sealing plate is thus valve-side end surface 1$a$. In battery cell 1, an opening of the discharge valve that opens and discharges internal gas or the like is provided in a sealing plate. However, in battery cell 1, the opening of the discharge valve is not necessarily provided in the sealing plate of the exterior can, and the discharge valve and the opening thereof may be provided in the bottom portion that is the end surface opposite to the sealing plate to function the bottom portion as the valve-side end surface. The discharge valve is configured to open when the internal pressure rises higher than a predetermined pressure, for example, 1.5 MPa, and prevents such a breakage of the metal case due to the increase of the internal pressure. For example, when battery cell 1 is in an abnormal state due to internal short-circuit, the discharge valve opens to prevent rupture. In this state, since the temperature of battery cell 1 is also very high, the gas and the electrolytic solution (ejected matter) discharged from the opened discharge valve has abnormally high temperature. In particular, in a battery pack in which battery cell 1 is a non-aqueous electrolyte secondary battery, such as a lithium ion battery, the temperature of the exhaust gas becomes an abnormally high temperature higher than 400° C. Furthermore, since the lithium ion battery is filled with a non-aqueous electrolytic solution, when the electrolytic solution is discharged to the outside of the case at a high temperature, the electrolytic solution may contact oxygen in the air and ignited, and may have an abnormally higher temperature. In not only the lithium ion battery but also other batteries, since the discharge valve opens in an abnormal state, the exhaust gas ejected from the discharge valve has an abnormally high temperature. Therefore, the energy of the exhaust gas is ejected from the opening discharge valve is reduced and discharged to the outside of the case in order to maintain high safety.

Battery Block 10

In battery block 10 illustrated in FIGS. 2 to 6, heat-resistant cap 8 is coupled to first end 10A, one end of battery block 10. In battery block 10, valve-side end surface 1$a$ of battery cell 1 is arranged at first end 10A. In battery block 10 including battery cells 1 arranged in plural rows, valve-side end surfaces 1$a$ of all battery cells 1 are arranged at first end 10A, or valve-side end surface 1$a$ of any one of battery cells 1 is arranged at first end 10A, and the exhaust gas is ejected from first end 10A of battery block 10. Battery block 10 shown in FIG. 3 couples battery assemblies 11 in the longitudinal direction. In battery block 10, exhaust gap 12 through which the exhaust gas is discharged is provided between battery assemblies 11. In battery block 10 shown in FIG. 3, four battery assemblies 11 are coupled in the longitudinal direction, so that three rows of exhaust gaps 12 are provided. Each exhaust gap 12 is arranged between adjacent battery assemblies 11, and disperses and exhausts the exhaust gas discharged from battery cells 1 of each of battery assemblies 11 to the surroundings.

In battery assembly 11, battery cells 1 are arranged in two rows at predetermined positions in battery holder 4. Battery holder 4 is molded from thermoplastic plastic material into a shape in which battery cells 1 are fitted and arranged at the predetermined positions. For the plastic of battery holder 4, an engineering plastic, such as polycarbonate, having excellent heat insulating properties, is suitable. In battery holder 4 shown in FIG. 3, battery cells 1 are arranged in two rows in a form extending in a longitudinal direction of battery case 2. In battery block 10 in the drawings, battery assemblies 11 are coupled in four stages by providing exhaust gaps 12 for exhaust gas between the assemblies. Battery block 10 connects battery cells 1 in series or in parallel with a lead plate (not illustrated) arranged in exhaust gap 12. In battery block 10 in the drawings, battery assemblies 11 including two rows of battery cells 1 in the longitudinal direction are arranged in four stages, and eight battery cells 1 in two rows and four stages are connected in series and in parallel. In battery pack 100 in the drawings, battery block 10 in which battery assemblies 11 each including the two rows of battery cells 1 are coupled in four stages is arranged in battery case 2, but the battery pack of the present invention does not specify the number or connection of battery cells 1 accommodated in the case to the structure shown in the drawings.

Exhaust gap 12 is a gap configured to guide the exhaust gas ejected from the discharge valve to the outside and connects battery cells 1 of battery assemblies 11 by lead plate 13. Exhaust gap 12 has a width ranging, for example, 1 mm to 5 mm, and diffuses and discharges the exhaust gas ejected from the discharge valve at the end surface of battery cell 1 to the surroundings.

Battery Case 2

Battery case 2 is made of thermoplastic plastic, such as polycarbonate, has an elongated box shape as a whole, and accommodates battery block 10 and circuit board 3 connected to battery block 10. Polycarbonate used for battery case 2 and battery holder 4 is durable from a low temperature to a high temperature and is excellent in impact resistance. However, the present invention does not specify battery holder 4 and battery case 2 as polycarbonate, and other thermoplastic resins that can be used in a wide temperature range, preferably engineering plastics, can also be used.

Battery case 2 shown in FIGS. 1 to 4 includes lower case 2A and upper case 2B that closes an opening of lower case 2A. Lower case 2A has a gutter shape with side walls 22 provided on both sides of bottom plate 21 having an elongated rectangular shape in the drawings. Battery block 10 is arranged between side walls 22. Upper case 2B has an outer peripheral edge coupled to lower case 2A to close an upper opening of lower case 2A. In lower case 2A illustrated in FIG. 4, side walls 22 on both sides are formed into a curved shape along the cylindrical battery. In lower case 2A, plural exhaust openings 23 for exhausting the exhaust gas to the outside are provided in of side walls 22 apart from each other in the longitudinal direction of side walls 22. In battery pack 100 in the drawings, heat dissipation plate 5 is disposed between battery block 10 and lower case 2A. Exhaust openings 23 open at positions facing heat dissipation plate 5, that is, outside heat dissipation plate 5. In battery pack 100, the exhaust gas ejected to exhaust gap 12 is discharged to the outside while having the energy reduced by heat dissipation plate 5. The exhaust gas passes through a gap provided between battery block 10 and heat dissipation plate 5, and further passes through a gap between heat dissipation plate 5 and battery case 2, and is discharged from exhaust opening 23 to the outside. In battery pack 100 having heat dissipation plate 5, the energy of the exhaust gas is reduced and discharged by heat dissipation plate 5, so that higher safety can be secured. However, in the battery pack of the present invention, the exhaust gas may be guided from the gap in the case to exhaust opening 23 and discharged without necessarily arranging heat dissipation plate 5.

Heat-Resistant Cap 8

Figure 1:
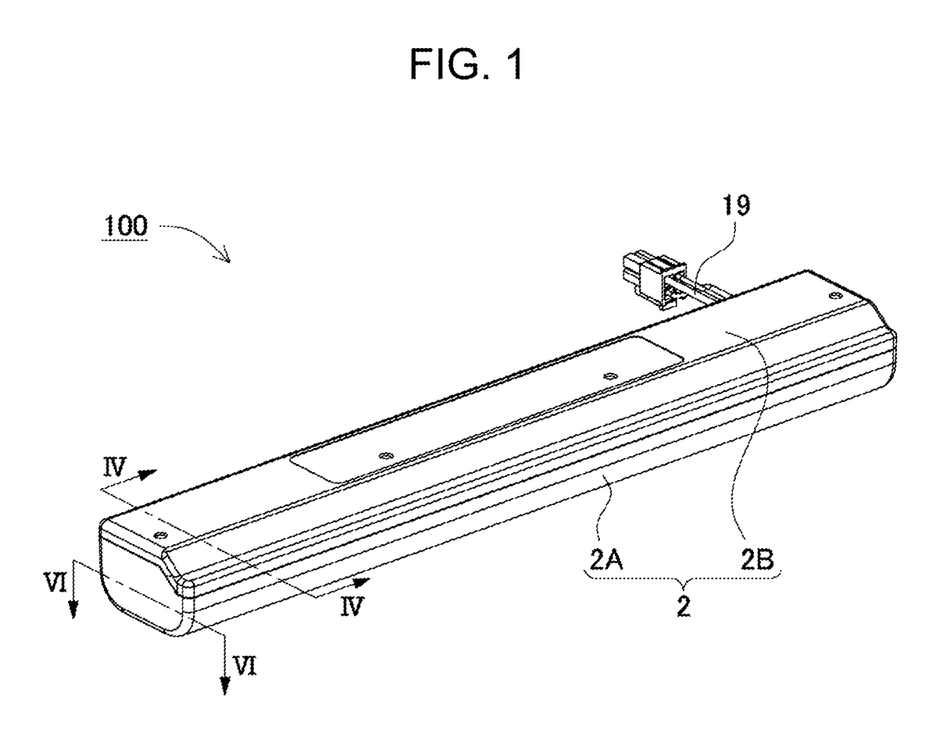
FIG. 1 is a perspective view of a battery pack according to an exemplary embodiment of the present invention.
Figure 2:
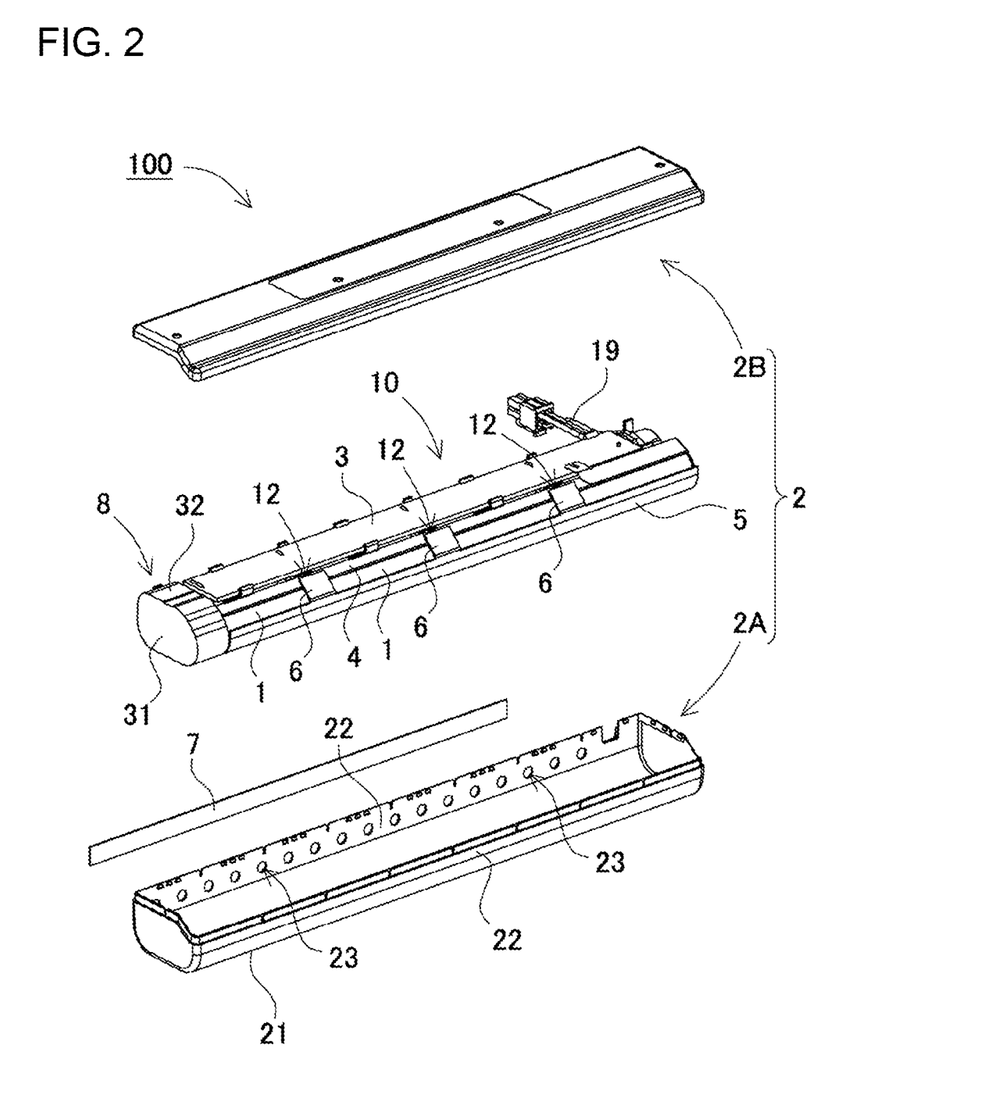
FIG. 2 is an exploded perspective view of the battery pack illustrated in FIG. 1.
Figure 3:
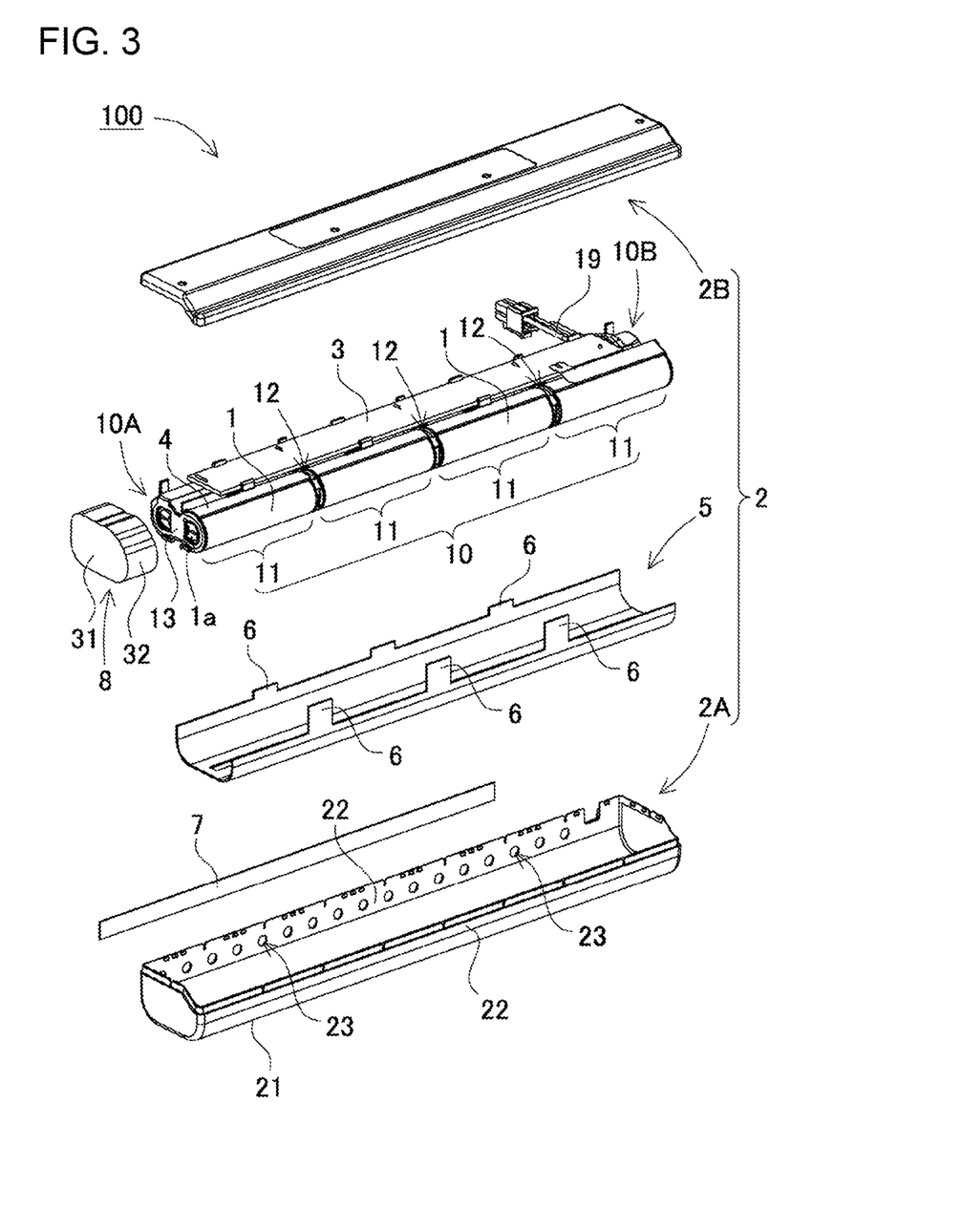
FIG. 3 is an exploded perspective view of the battery pack illustrated in FIG. 2.

In battery pack 100 shown in FIGS. 2 and 3, heat-resistant cap 8 is coupled to battery block 10 in order to reduce and discharge the energy of the exhaust gas ejected to first end 10A of battery block 10. In battery pack 100 in the drawings, heat-resistant cap 8 is coupled to first end 10A of battery block 10. An end surface plate (not illustrated) unitarily molded with battery holder 4 is arranged at second end 10B from which lead wire 19 is drawn. Although not illustrated, the end surface plate has a structure in which a heat insulating plate is arranged inside or a diffusion gap that diffuses the exhaust gas is provided to prevent heat damage due to the high-temperature exhaust gas. However, although not illustrated, battery block 10 may have a heat resistant structure by coupling heat-resistant cap 8 to both ends, or battery cell 1 may be arranged such that valve-side end surface 1a of battery cell 1 is not arranged on an end surface of battery block 10 to which heat-resistant cap 8 is not coupled.

Heat-resistant cap 8 is produced by molding thermoplastic plastic having more excellent heat resistance characteristics than battery holder 4 and battery case 2. For example, a fiber-reinforced plastic in which inorganic fibers are embedded and reinforced, such as PBT, is molded and produced as a plastic excellent in heat resistance characteristics. Heat-resistant cap 8 is coupled to the end of battery block 10, reduces the energy of the exhaust gas ejected from valve-side end surface 1a of battery cell 1, and changes the flow direction. Heat-resistant cap 8 illustrated in FIGS. 2 to 7 includes closing plate 31 facing end surface 10a of the battery block, peripheral wall 32 coupled to a periphery of closing plate 31, and partition wall 33 provided on a surface of closing plate 31 facing end surface 10a of the battery block. Closing plate 31, peripheral wall 32, and partition wall 33 are unitarily molded.

Closing plate 31 provides first discharge gap 15A between the closing plate and end surface 10a of the battery block to discharge the exhaust gas ejected from the discharge valve. Closing plate 31 causes the exhaust gas ejected from the discharge valve to collide with an inner surface of the closing plate in first discharge gap 15A to reduce the energy of the gas, and further diffuses the energy to the surroundings. First discharge gap 15A provided between closing plate 31 and battery block end surface 10a, more precisely, between closing plate 31 and the end surface of battery cell 1 has a width, for example, equal to or larger than 0.5 mm and equal to or less than 3 mm so as to reduce the energy of motion of the exhaust gas while smoothly discharging the exhaust gas.

The exhaust gas passing through first discharge gap 15A is diffused to the surroundings by closing plate 31 and collides with an inner side of peripheral wall 32. Lead plate 13 fixed to battery cell 1 is arranged in first discharge gap 15A. Lead plate 13 is welded and fixed to the end surface of battery cell 1. Lead plate 13 includes a welded portion across a slit provided in a center portion of the lead plate. The welded portion is welded to an end surface of battery cell 1. Since an outer peripheral portion of the lead plate outside the welded portion across the slit is not welded to the end surface of battery cell 1, a slight gap is formed by the lead plate without adhering to the end surface of battery cell 1. Therefore, first discharge gap 15A is provided between closing plate 31 and lead plate 13 and between lead plate 13 and the end surface of the battery cell. The total width of first discharge gap 15A formed on both surfaces of lead plate 13 is preferably determined to the above-described range such that the energy of the motion of the exhaust gas may be reduced by allowing the exhaust gas to pass through the narrow gap while smoothly discharging the exhaust gas.

Peripheral wall 32 provides second discharge gap 15B between peripheral wall 32 and the outer circumference of battery block 10 in order to redirect and discharge the exhaust gas flowing in from first discharge gap 15A. Peripheral wall 32 illustrated in FIG. 5 causes the exhaust gas flowing in from first discharge gap 15A to collide with the inner side of the peripheral wall to reduce the energy, and changes the flow direction perpendicularly without further scattering the exhaust gas to the surroundings to change the flow direction to the longitudinal direction of battery cell 1. The exhaust gas collides with the inner surface of peripheral wall 32, changes the direction, reduces the energy of the motion, and is discharged in the longitudinal direction of battery cell 1. Peripheral wall 32 provides second discharge gap 15B between the peripheral wall and the outer circumference surface of battery cell 1 in order to allow the exhaust gas to flow between the peripheral wall and battery cell 1. The exhaust gas that has collided with the inner side of closing plate 31 and has flown into second discharge gap 15B is redirected inside partition wall 33 as indicated by an arrow in the drawings and is discharged in the longitudinal direction of battery cell 1.

Figure 6:
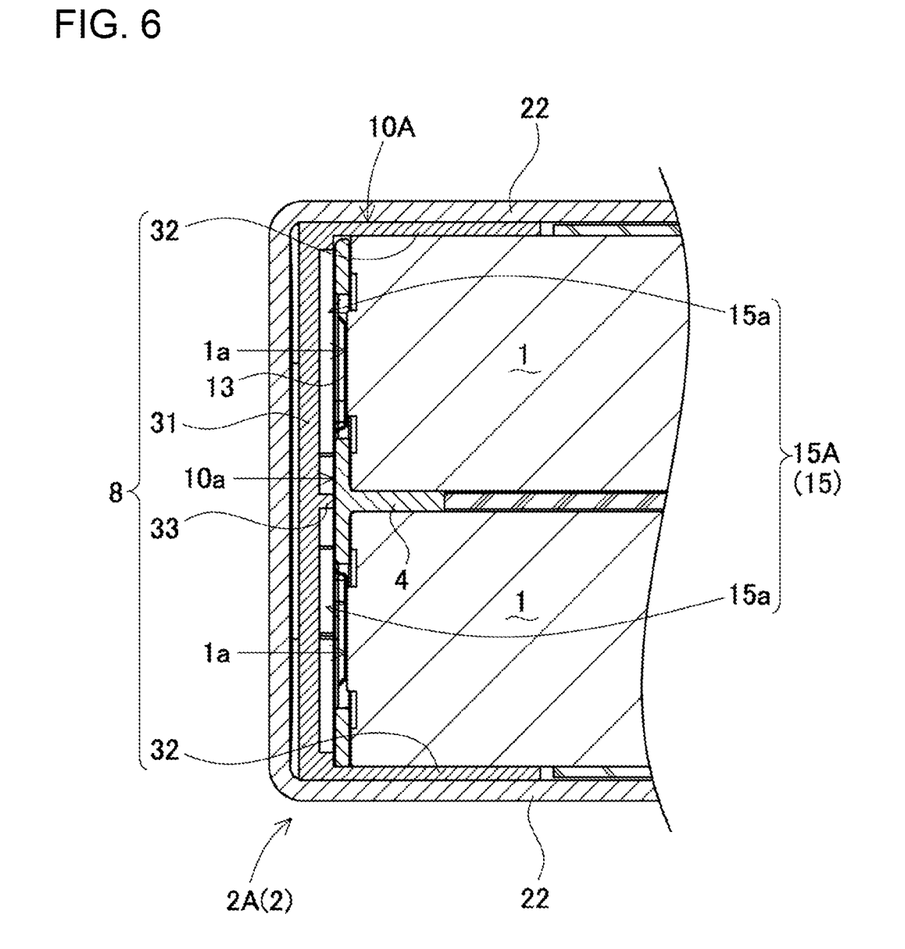
FIG. 6 is a cross-sectional view of the battery pack along line VI-VI illustrated in FIG. 1.

Partition wall 33 in FIG. 6 is fixed perpendicularly to the inner surface of closing plate 31 to partition discharge gap 15 between the closing plate and the end surface of battery cell 1. Partition wall 33 separates divided discharge gap 15a provided between closing plate 31 and valve-side end surface 1a of abnormal battery cell 1 with the opening discharge valve from divided discharge gap 15a between closing plate 31 and adjacent battery cell 1. When battery cell 1 thermally runs away due to, for example, an internal short circuit or the like, the internal pressure of the cell abnormally rises and the discharge valve opens. In this state, the exhaust gas ejected from the discharge valve has an abnormal high temperature. The high-temperature exhaust gas heats adjacent battery cell 1, and induces thermal runaway of the adjacent battery cell. Partition wall 33 prevents the high-temperature exhaust gas from flowing to the end surface of adjacent battery cell 1 to prevent induction of thermal runaway. Since partition wall 33 is provided to prevent the exhaust gas ejected from abnormal battery cell 1 from heating adjacent battery cell 1, discharge gap 15 partitions between battery cells 1.

Figure 4:
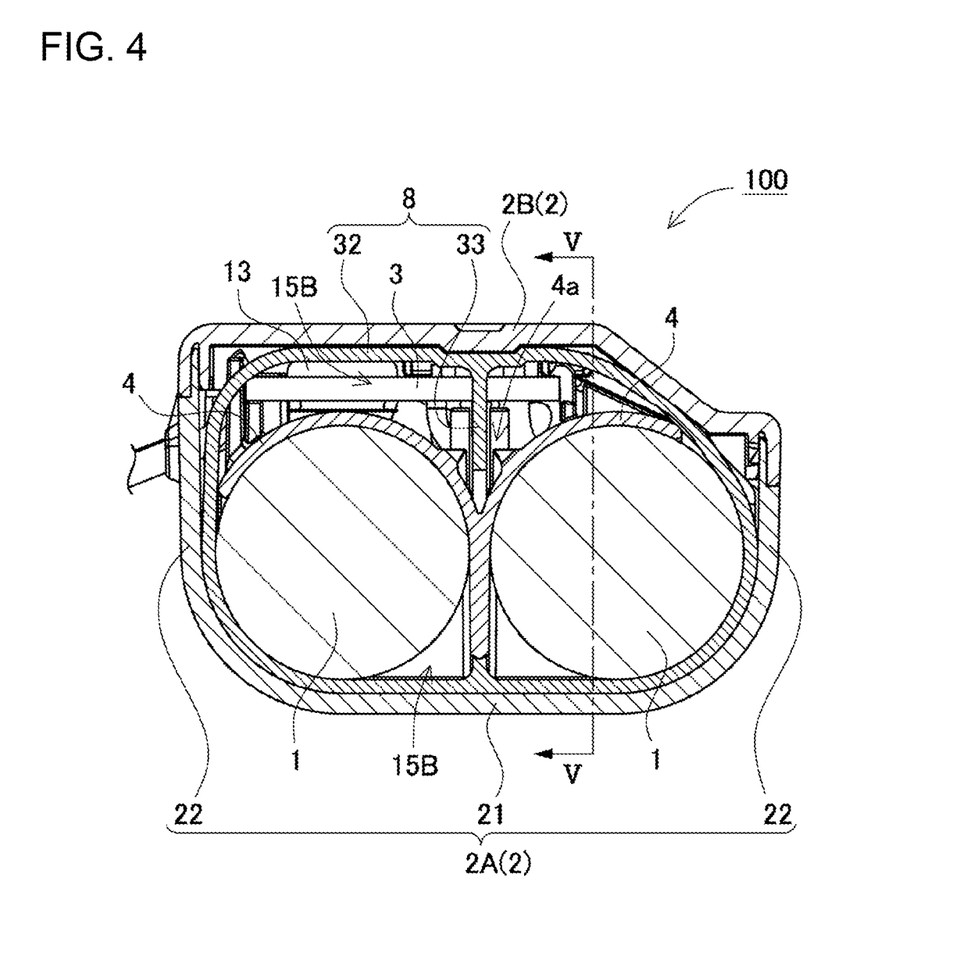
FIG. 4 is a sectional view of the battery pack along line IV-IV illustrated in FIG. 1.

In heat-resistant cap 8 shown in FIG. 4, second discharge gap 15B is wider on the upper part thereof than on the lower part thereof in the drawing, and a larger amount of exhaust gas is exhausted on the upper part than the lower part. On the upper part of second discharge gap 15B, fitting groove 4a is provided in battery holder 4, and partition wall 33 is guided to fitting into groove 4a to arrange partition wall 33 at a predetermined position.

Partition wall 33 prevents the ejected exhaust gas from flowing to the end surface of adjacent battery cell 1, and prevents the exhaust gas from heating adjacent battery cell 1. Partition wall 33 protrudes from closing plate 31 to first discharge gap 15A, and is arranged between the respective end surfaces of the battery cells. In heat-resistant cap 8 shown in FIG. 5, partition wall 33 is provided not only in first discharge gap 15A but also in second discharge gap 15B, and partition wall 33 of first discharge gap 15A and second discharge gap 15B has a single plate shape. Heat-resistant cap 8 can more effectively prevent the high-temperature exhaust gas from heating adjacent battery cell 1, and can more effectively prevents a thermal failure of adjacent battery cell 1. However, the partition wall may be provided only in first discharge gap 15A to prevent the exhaust gas from heating the end surface of adjacent battery cell 1 at the end surface of battery block 10.

Figure 5:
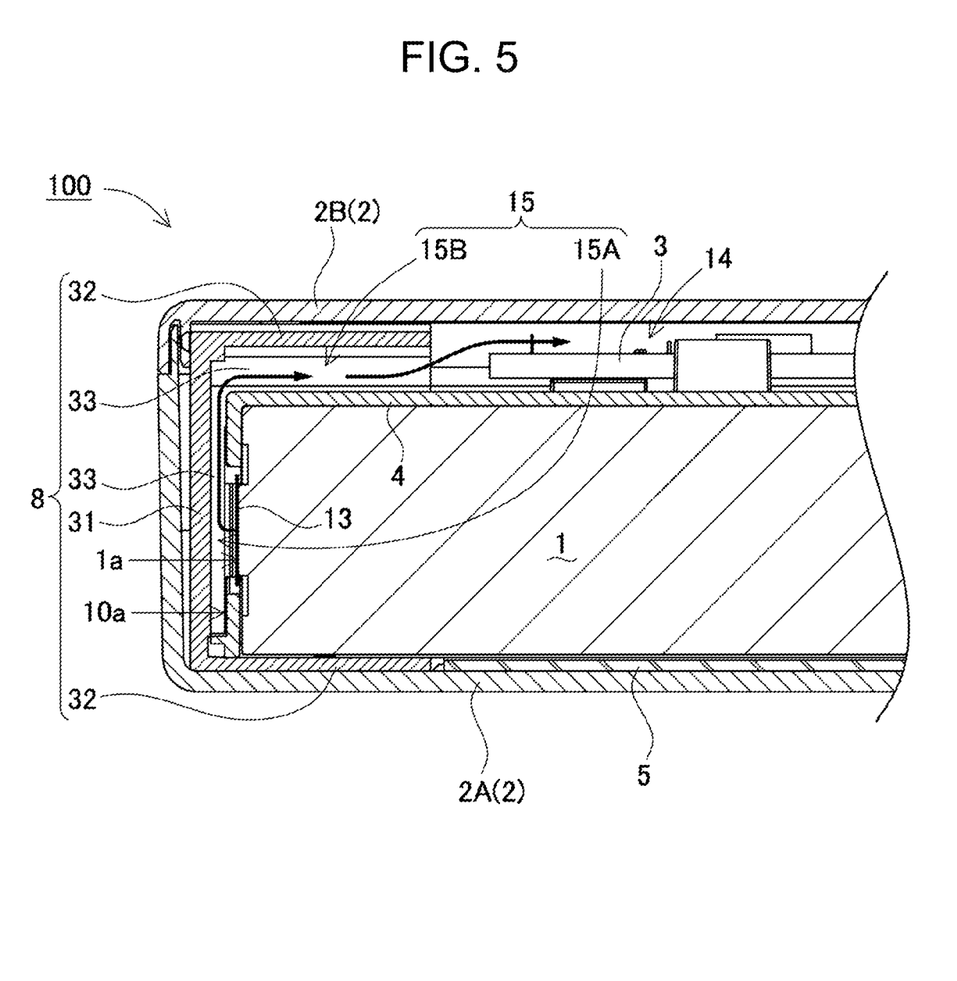
FIG. 5 is a cross-sectional view of the battery pack along line V-V illustrated in FIG. 4.
Figure 7:
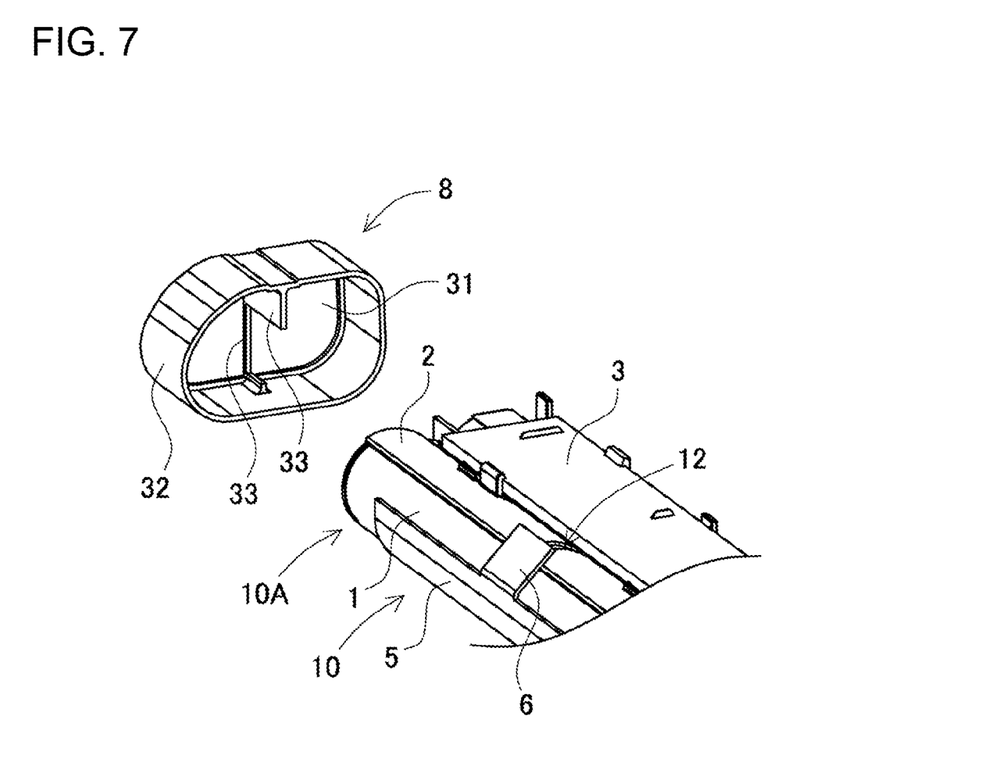
FIG. 7 is an exploded perspective view of the battery pack for illustrating a heat-resistant cap and a battery block.

In heat-resistant cap 8 shown in FIGS. 5 and 7, a center portion of partition wall 33 disposed in first discharge gap 15A is lower than both ends of partition wall 33 which are raised to extend to second discharge gap 15B. Partition wall 33 protruding from the inner surface of closing plate 31 contacts a surface of lead plate 13 to divide first discharge gap 15A between battery cells 1, and both ends of partition wall 33 extend into a valley on between the outer circumferences of the cylindrical batteries to divide, between battery cells 1, second discharge gap 15B provided between battery cell 1 and peripheral wall 32. In heat-resistant cap 8 shown in FIG. 4, second discharge gap 15B on the upper side of battery cell 1 is wider than that in the lower side in the drawings, and thus a vertical width of partition wall 33 on the upper side is larger than that of the lower side, so as to guide a lower edge of partition wall 33 on the upper side to fitting groove 4a provided in battery holder 4. The structure in which partition wall 33 is guided to fitting groove 4a of battery holder 4 prevents a positional displacement of partition wall 33 while second discharge gap 15B is partitioned so as to more reliably prevent the exhaust gas from leaking, and the heating of adjacent battery cell 1 by the exhaust gas can be more reliably suppressed.

Heat Dissipation Plate 5

Battery pack 100 shown in FIGS. 2 and 3 further includes heat dissipation plate 5 in order to more effectively reduce the energy of the exhaust gas. Heat dissipation plate 5 is arranged inside lower case 2A and between lower case 2A and battery block 10, and reduces energy of exhaust gas ejected from battery cell 1. Heat dissipation plate 5 may be preferably made of a plate material having more thermal conduction characteristics than battery case 2. Heat dissipation plate 5 absorbs thermal energy of the colliding exhaust gas, and quickly diffuses the absorbed thermal energy over a wide area to conduct the thermal energy to lower case 2A, and lower case 2A dissipates the thermal energy to the outside over a wide area.

As a plate member having preferable thermal conduction characteristics, a metal plate is used for heat dissipation plate 5. Aluminum (including an aluminum alloy) plate is suitable for heat dissipation plate 5. Since the aluminum plate has heat resistance and excellent thermal conduction characteristics and is light, the thermal energy of the exhaust gas may be quickly diffused and efficiently dissipated although heat dissipation plate 5 is reduced in weight. In battery pack 100 in the drawings, side walls 22 of lower case 2A are extended along an outer peripheral surface of the cylindrical battery, and heat dissipation plate 5 is arranged between side wall 22 and battery block 10. In heat dissipation plate 5 arranged here, a portion of heat dissipation plate 5 arranged on an inner surface of bottom plate 21 of lower case 2A has a planar shape while a portion of heat dissipation plate 5 arranged on each side wall 22 has a curved shape extended along an outer surface of the cylindrical battery. Battery block 10 is arranged inside heat dissipation plate 5, and battery cell 1 is arranged at a predetermined position in battery holder 4 in battery block 10. Therefore, battery assembly 11 of battery block 10 is arranged inside heat dissipation plate 5. A side wall portion of the heat dissipation plate that is curved inward has a height that is about half the thickness of battery block 10 such that battery block 10 may be smoothly guided and arranged at a predetermined position, and inner surfaces of the side wall portions may contact both side surfaces of battery block 10. The side wall portions of the heat dissipation plate contacting both side surfaces of curved battery block 10 facilitate the heat conduction from battery block 10 efficiently. However, if an air layer is formed between the side wall portion and battery block 10, the air layer inhibits heat conduction. This is because, the curved side wall portion of the heat dissipation plate which is higher than half the thickness of battery block 10 causes an opening width of an upper edge of heat dissipation plate 5 to be narrower than a lateral width of battery block 10, and causes battery block 10 to hardly be inserted smoothly.

Heat dissipation plate 5 efficiently absorbs the thermal energy of battery block 10 by bringing the inner surfaces of the side wall portions of the heat dissipation plate in surface contact with curved surfaces on both sides of battery block 10 and bringing a bottom surface portion into surface contact with a bottom surface of battery block 10. Furthermore, heat dissipation plate 5 efficiently thermally conducts the absorbed thermal energy to lower case 2A by bringing an outer surface in surface contact with an inner surface of lower case 2A. As heat dissipation plate 5, an aluminum plate is used as a metal plate having excellent thermal conduction characteristics, but a metal plate other than aluminum, for example, a copper plate, or another plate member having heat resistance and excellent thermal conduction characteristics may also be used.

Heat-Resistant Cover 6

Heat-resistant cover 6 is arranged on a side edge of heat dissipation plate 5 at a position covering an opening of exhaust gap 12 between battery assemblies 11. A metal plate made of aluminum or the like having excellent heat resistance and thermal conduction characteristics is suitable for heat-resistant cover 6, as for heat dissipation plate 5. In battery pack 100 shown in FIGS. 2 and 3, heat dissipation plate 5 and heat-resistant cover 6 are made unitarily of a single metal plate. This structure allows heat-resistant cover 6 to be accurately arranged via heat dissipation plate 5. Heat-resistant cover 6 is made of a bendable metal plate since heat-resistant cover 6 is bent to close the opening of exhaust gap 12 with battery block 10 being arranged inside. Heat-resistant cover 6 and heat dissipation plate 5 made unitarily of a single metal plate allows heat-resistant cover 6 to be bendable, and to be arranged at an ideal position on the opening of exhaust gap 12 of battery block 10 so as not to be displaced.

Heat-resistant cover 6 has a lateral width wider than exhaust gap 12 so as to sufficiently cover the opening of exhaust gap 12. The lateral width of heat-resistant cover 6 is larger than that of heat-resistant cover 6 by a difference, for example, equal to or larger than 1 mm, preferably equal to or larger than 2 mm, and more preferably equal to or larger than 3 mm. Heat-resistant cover 6 with an excessively large width hardly bent along the surface of the cylindrical battery to close exhaust gap 12 in an ideal state, so that the lateral width of the heat-resistant cover 6 is, for example, equal to or less than 20 mm, preferably equal to or less than 15 mm. In battery pack 100 shown in FIG. 3, since four battery assemblies 11 are coupled to one another, exhaust gaps 12 arranged between respective battery assemblies 11 are in three rows. Since heat-resistant cover 6 closes the opening of each exhaust gap 12, three rows of heat-resistant covers 6 are provided along exhaust gaps 12 on the side edge of heat dissipation plate 5 shown in FIG. 3. That is, plural heat-resistant covers 6 that independently closes respective exhaust gaps 12 are provided.

Heat-resistant cover 6 may be lengthened to widen the closed region of the opening of exhaust gap 12. In battery pack 100 shown in FIG. 3, circuit board 3 is arranged on an upper surface of battery block 10, heat-resistant cover 6 has a length to allow a leading edge of heat-resistant cover 6 to be close to both side edges of circuit board 3, and both heat-resistant cover 6 and circuit board 3 cover the opening of exhaust gap 12. Circuit board 3 is made of thermosetting resin, such as glass epoxy, and has more excellent heat resistance than battery case 2 made of thermoplastic resin. In battery pack 100 having this structure, almost the entire circumference of the opening of exhaust gap 12 is covered with heat dissipation plate 5, heat-resistant cover 6, and circuit board 3 having more excellent heat resistance characteristics than battery case 2. When a wide gap is provided between heat-resistant cover 6 and circuit board 3, the exhaust gas passes through the gap, and thus the gap is as narrow as possible, for example, 2 mm or less, preferably 1 mm or less, to suppress the passage of the exhaust gas.

Circuit Board 3

An electronic component (not illustrated) connected to battery cells 1 to constitute a protection circuit for battery cells 1 is mounted onto circuit board 3. The protection circuit is a circuit that prevents overcharge and overdischarge of battery cells 1, a circuit that prevents overcurrent, or a circuit that interrupts current in a state in which the temperature rises abnormally.

Battery pack 100 as described above causes the exhaust gas ejected from the discharge valve to collide with heat-resistant cap 8, heat dissipation plate 5, heat-resistant cover 6, and circuit board 3 to reduce the energy of the gas, and to further diffuse and be discharged from exhaust opening 23 provided in lower case 2A to the outside of the case. Exhaust opening 23 is arranged at a position facing heat dissipation plate 5 so as to cause the exhaust gas to collide with heat dissipation plate 5 and heat-resistant cover 6 to reduce and diffuse the energy of the gas, and then, the exhaust gas is discharged to the outside of battery case 2. Exhaust opening 23 arranged at the position facing heat dissipation plate 5, with heat dissipation plate 5 inside, discharges the gas diffused by heat dissipation plate 5 from exhaust opening 23 to the outside of battery case 2. In lower case 2A shown in FIGS. 2 and 3, plural exhaust openings 23 are arranged in side wall 22 of lower case 2A and separated away from each other in the longitudinal direction. Battery pack 100 causes the exhaust gas ejected to exhaust gap 12 to diffuse by colliding with heat dissipation plate 5 and heat-resistant cover 6, and causes the diffused exhaust gas to flow into gap 14 in the case to be exhausted from exhaust opening 23 to the outside of battery case 2. Lower case 2A is attached with label 7 peeled off or melted by the exhaust gas so as to close the opening of exhaust opening 23. In battery pack 100, exhaust opening 23 may be closed by label 7 to prevent foreign substances from entering.

INDUSTRIAL APPLICABILITY

The present invention may be effectively used for a battery pack configured to safely discharge exhaust gas.

REFERENCE MARKS IN THE DRAWINGS

100 battery pack
1 battery cell
1*a* valve-side end surface
2 battery case
2A lower case
2B upper case
3 circuit board
4 battery holder
4*a* fitting groove
5 heat dissipation plate
6 heat-resistant cover
7 label
8 heat-resistant cap
10 battery block
10A first end
10*a* battery block end surface
10B second end
11 battery assembly
12 exhaust gap
13 lead plate
14 gap
15 discharge gap
15A first discharge gap
15*a* divided discharge gap
15B second discharge gap
19 lead wire
21 bottom plate
22 side wall
23 exhaust opening
31 closing plate
32 peripheral wall
33 partition wall

The invention claimed is:

1. A battery pack comprising:
a battery block including a plurality of battery cells arranged in a plurality of rows, each of the plurality of battery cells including a discharge valve provided at an end of the each of the plurality of battery cells, the discharge valve being configured to open when an internal pressure of the each of the plurality of battery cells exceeds a predetermined pressure;
a heat-resistant cap coupled to an end of the battery block; and
a battery case accommodating the battery block therein, the battery case having an exhaust opening configured to discharge exhaust gas from the discharge valve to an outside of the case, wherein
a valve-side end surface of the each of the plurality of battery cells at which the discharge valve of the each of the plurality of battery cells is disposed at a first end of the battery block to which the heat-resistant cap is coupled,
the heat-resistant cap includes:
a closing plate providing a first discharge gap between the closing plate and the battery block end surface;
a peripheral wall coupled to a periphery of the closing plate, the peripheral wall providing a second discharge gap between the peripheral wall and an outer circumference of the battery block; and a partition wall provided on a surface of the closing plate facing an end of the battery block and between respective end surfaces of adjacent battery cells out of the plurality of battery cells, the partition wall partitioning the first discharge gap into portions on the respective end surfaces of adjacent battery cells, and the first discharge gap and the second discharge gap constitutes a discharge gap configured to allow the exhaust gas discharged to the valve-side end surface of the each of the battery cells to pass through the discharge gap and be discharged from the exhaust opening to an outside of the battery pack.

2. The battery pack according to claim 1, wherein the battery block further includes a battery holder positioning the plurality of battery cells at predetermined positions, and the second discharge gap is provided between the peripheral wall and the battery holder.

3. The battery pack according to claim 2, wherein the battery holder and the battery case are made of plastic, and the heat-resistant cap is made of plastic having a higher heat resistance temperature than the battery holder and the battery case, and the closing plate, the peripheral wall, and the partition wall are unitarily molded with plastic.

4. The battery pack according to claim 3, wherein the heat-resistant cap is made of fiber-reinforced plastic reinforced with heat-resistant fibers.

5. The battery pack according to claim 4, wherein the heat-resistant fibers are inorganic fibers.

6. The battery pack according to claim 1, wherein the battery block further includes a lead plate provided at an end surface of the first end of the battery block, the lead plate connecting the adjacent battery cells to each other, and a leading edge of the partition wall contacts a surface of the lead plate.

7. The battery pack according to claim 1, wherein the plurality of battery cells are a plurality of cylindrical batteries.

8. The battery pack according to claim 7, wherein the partition wall is arranged in a valley formed on outer peripheries of adjacent cylindrical batteries out of the plurality of cylindrical batteries.

9. The battery pack according to claim 1, wherein the plurality of battery cells are non-aqueous electrolyte secondary batteries.

10. The battery pack according to claim 9, wherein the plurality of battery cells are lithium ion batteries.

* * * * *